United States Patent [19]
Montigny et al.

[11] 3,801,074

[45] Apr. 2, 1974

[54] MIXING AND DISPENSING APPARATUS

[75] Inventors: Joseph William Montigny, 382 E. Merced, West Covina; Jack Ray Brothers, Jenkin Rialto, both of Calif.

[73] Assignees: said Montigny, by said Brothers; Montigny Company, ; by said Brothers

[22] Filed: Aug. 30, 1971

[21] Appl. No.: 176,165

Related U.S. Application Data

[63] Continuation-in-part of Ser. No. 884,672, Dec. 12, 1969, abandoned.

[52] U.S. Cl................................ 259/8, 259/154
[51] Int. Cl............................................ B01f 7/24
[58] Field of Search.............. 259/8, 7, 23, 24, 154; 23/252

[56] References Cited
UNITED STATES PATENTS

| | | |
|---|---|---|
| 3,297,306 | 1/1967 | Napier.................................... 259/8 |
| 2,847,196 | 8/1958 | Franklin................................. 259/8 |
| 3,265,365 | 8/1966 | Ward...................................... 259/8 |
| 3,164,374 | 1/1965 | Ralph..................................... 259/8 |

*Primary Examiner*—Robert W. Jenkins
*Attorney, Agent, or Firm*—Smyth, Roston & Pavitt

[57] ABSTRACT

Apparatus for mixing proportionate quantities of a resin and a hardener into a relatively quick-hardening adhesive, and dispensing the adhesive mixture. A pair of motor-driven rotary gear pumps transfer resin and hardener from separate supply chambers to a mixing chamber from which the adhesive mixture is dispensed. One of the embodiments of the apparatus includes a pneumatic drive system for operating the pumps in a pulse-like fashion to dispense a metered quantity of the adhesive mixture. Each of the embodiments includes an improved hot water heating system for maintaining the resin and hardener in semi-fluid states in their respective storage chambers.

11 Claims, 11 Drawing Figures

PATENTED APR 2 1974 3,801,074

INVENTORS
JOSEPH W. MONTIGNY
JACK R. BROTHERS
BY KENDRICK and SUBKOW

Paul L. Gardner
ATTORNEYS

INVENTORS.
JOSEPH W. MONTIGNY
JACK R. BROTHERS
BY KENDRICK, SUBKOW & KRIEGEL

Paul L. Gardner
ATTORNEYS

INVENTORS.
JOSEPH W. MONTIGNY
JACK R. BROTHERS
BY KENDRICK, SUBKOW & KRIEGEL

Paul L. Gardner
ATTORNEYS

MIXING AND DISPENSING APPARATUS

This application is a continuation-in-part of application Ser. No. 884,672, filed Dec. 12, 1969, now abandoned.

Pavement markers or "buttons" are typically secured in place on streets and highways by suitable epoxy resin adhesives. Such adhesives are commonly prepared by mixing predetermined quantities of any epoxy resin and a suitable hardener just prior to the time it is desired to apply the adhesive to the markers and secure the markers on the street or highway.

The steps of preparing the adhesive mixture, applying the adhesive to the pavement markers and securing the markers in place have been facilitated by employing a mixing and dispensing apparatus mounted on the rear portion of a vehicle (e.g., a truck). A workman operates the apparatus to dispense adhesive onto the markers and places the adhesive-backed markers on the pavement as the vehicle moves forward. The workman operating the apparatus may apply the markers to the pavement, adhesive side down, as the vehicle moves forward, or he may place the markers on the pavement with the adhesive side up, in which case a second workman following the truck turns the markers adhesive-side down and secures the markers on the pavement.

The apparatuses heretofore employed for mixing and dispensing the adhesive typically comprise relatively expensive pumps and separate metering mechanisms for transferring metered quantities of resin and hardener to a relatively complex mixing chamber. In addition to being relatively expensive, these prior art devices are subject to several other disadvantages. Since the resin and hardener must be pumped through separate metering devices, which include various valves, there is a relatively long time lag between the time the workman actuates the dispensing switch and the time the apparatus actually expels the adhesive mixture. Moreover, the mixing devices have not produced adhesive mixtures of constant homogeneity, and the heating systems for the resin and hardener have been relatively expensive and inefficient to operate. Still another disadvantage associated with such prior art mixing and dispensing apparatuses is that they have been difficult to keep clean.

In view of the foregoing, it is an object of the present invention to provide an improved mixing and dispensing apparatus which is relatively inexpensive to construct and maintain, and highly efficient in operation.

The foregoing and additional objects and advantages have been realized by the improved mixing and dispensing apparatus of the present invention which includes separate chambers for storing the substances to be mixed (e.g., epoxy resin and hardener), a mixing chamber having means for mixing means therein; pumps for pumping proportionate quantities of the substances from the storage chambers to the mixing chamber and dispensing the mixture therefrom, a power-operable drive system for operating the pumps and the mixing means, and a heating system for maintaining the substances to be mixed in semi-liquid states in their respective storage chambers.

DESCRIPTION OF EMBODIMENT SHOWN IN FIGS. 1–7

The mixing and dispensing apparatus illustrated in FIGS. 1–7 of the drawings is adapted to mix metered quantities of two substances (e.g., resin and hardener) into a relatively homogeneous adhesive mixture and dispense metered quantities of the adhesive mixture.

Figure 1:
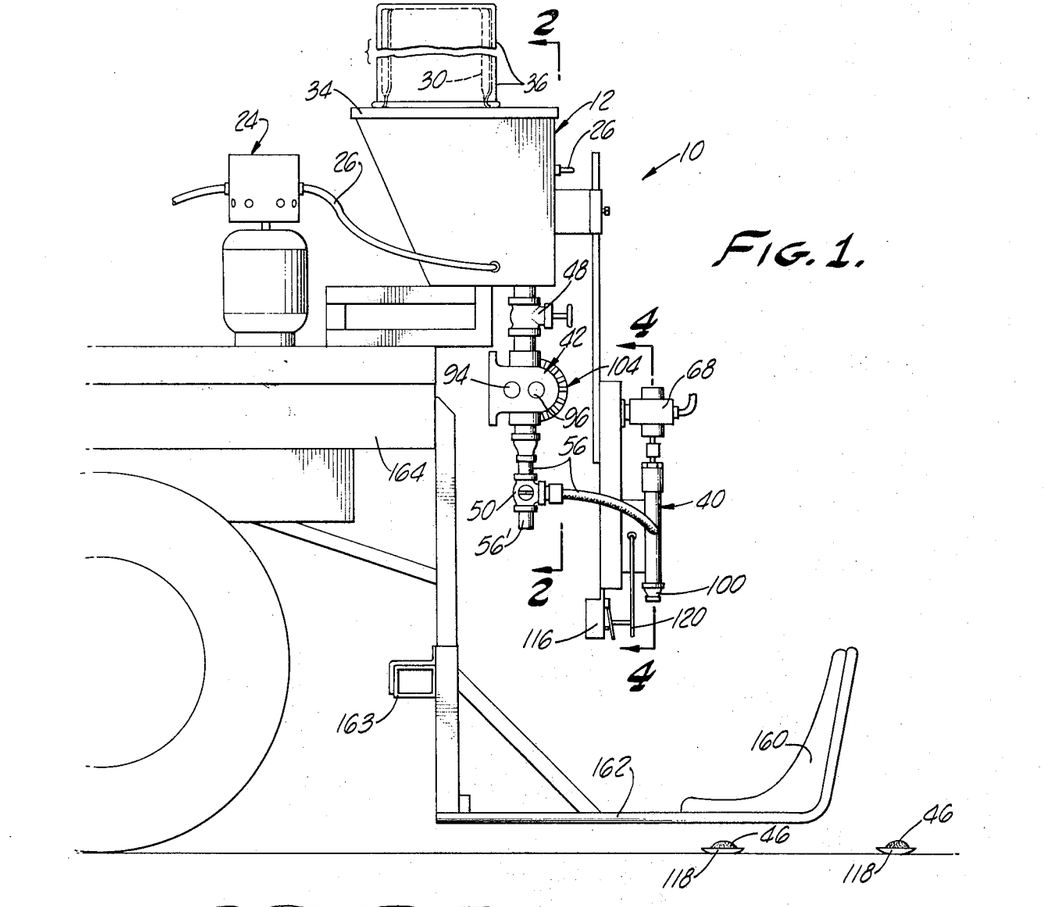
FIG. 1 is a side elevation view of one of the preferred embodiments of the improved mixing and dispensing apparatus of the present invention, the apparatus being mounted on the rear end of a truck bed.
Figures 3, 6:
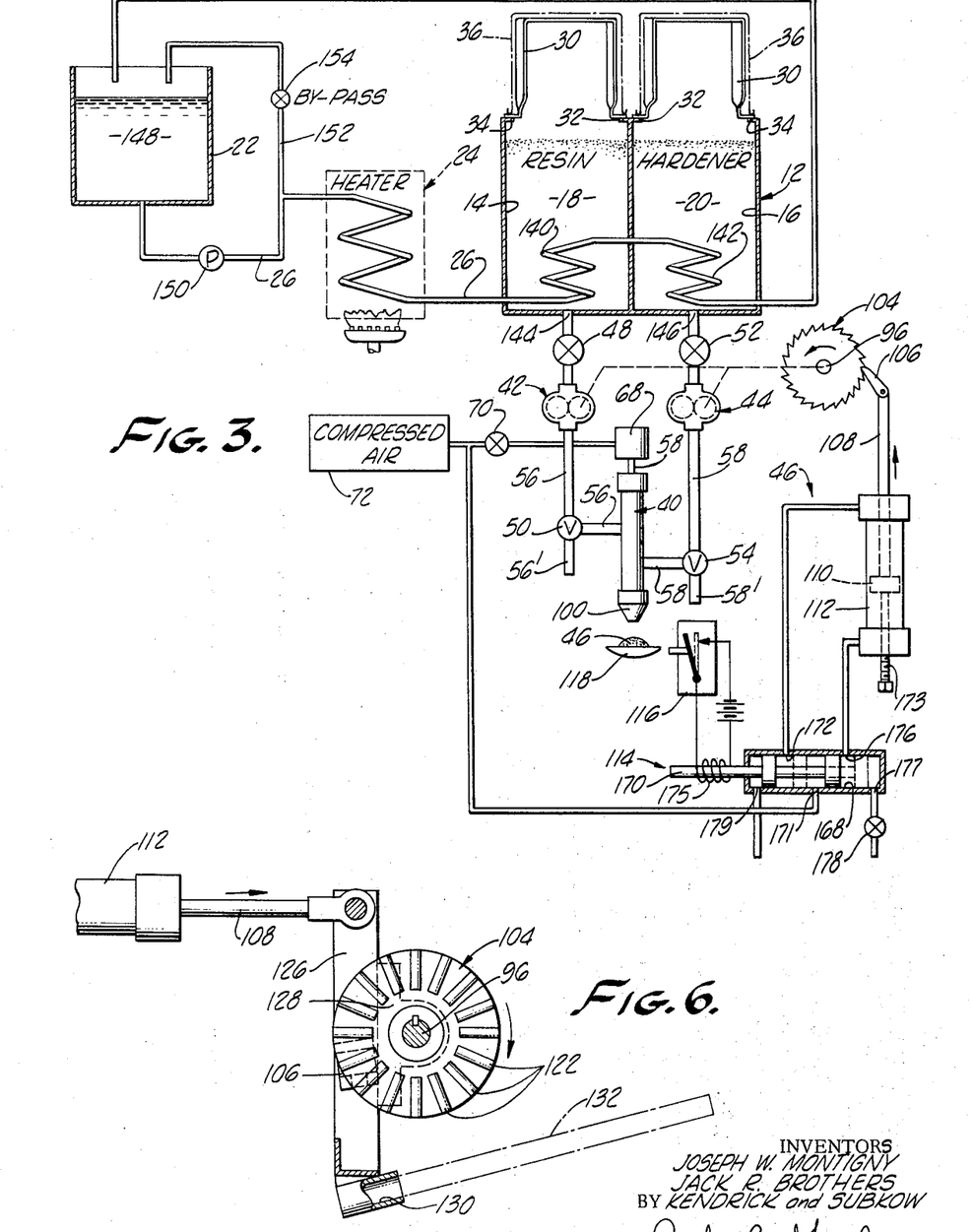
FIG. 3 is a schematic diagram of the mixing and dispensing apparatus shown in FIG. 1.
FIG. 6 is a sectional side elevation view taken along the line 6—6 of FIG. 2, showing the details of a portion of the improved drive mechanism for operating the pumps in the FIG. 1 embodiment.

Referring to FIGS. 1 and 3, the improved mixing and dispensing apparatus 10 shown therein is seen to comprise a tank 12 divided into separate chambers, 14 and 16, for containing supplies of epoxy resin 18 and a suitable hardener 20, respectively. An improved heating system, including a water supply tank 22 (FIG. 3), a butane torch heater 24 and heat-conductive tubing 26, is provided for maintaining the resin 18 and hardener 20 in relatively fluid states in their respective storage chambers 14 and 16.

An upstanding, inverted, generally U-shaped scraper blade 30 is provided across the opening 32 in the top cover 34 of each chamber 14, 16 to facilitate filling the chambers with the relatively pasty resin and hardener substances. Each of the chambers 14, 16 is filled by inverting a can 36 of the substance (resin or hardener) over the scraper blade 30, and rotating or spinning the inverted can so that the scraper blade will separate the substance from the side and bottom walls of the can, whereupon the substance will drop into its chamber.

An improved mixing chamber 40 for receiving and mixing metered quantities of resin 18 and hardener 20 communicates with the storage chambers 14, 16 through a pair of rotary gear pumps 42, 44 respectively. The pumps 42, 44 are intermittently operated by an improved, pneumatic drive system 46 to pump metered quantities of resin 18 and hardener 20 to the mixing chamber 40 and dispense a predetermined quantity of the adhesive mixture 46 (FIG. 3) therefrom. Valves 38, 50, 52, and 54 are provided in the lines 56 and 58, respectively, between the mixing chamber 40 and the storage chambers 14, 16 for regulating the flow of resin and hardener from their respective chambers 14 and 16.

A rotatable shaft 58 (best shown in FIG. 4) having oppositely directed vanes or blades 60 and 62 on its upper and lower portions, 64 and 66, respectively, extends longitudinally through a suitable bearing 65 and a bearing 67, which may be made of a fluorocarbon polymer, e.g., TEFLON, a Trademark of E. I. DuPont de Nemours and Company, and into the mixing chamber 40. It is, of course, contemplated that other suitable bearings (e.g., ball bearings) may be employed instead of or in addition to bearings 65 and 67, and that continuous helical blades may be employed in place of the separates vanes 60 and 62. The mixing stick or shaft 58 is rotated by a pneumatic motor 68 (FIGS. 1 and 3) which is connected through a suitable shut-off valve 70 to a compressed air supply 72 (FIG. 3).

Figure 4:
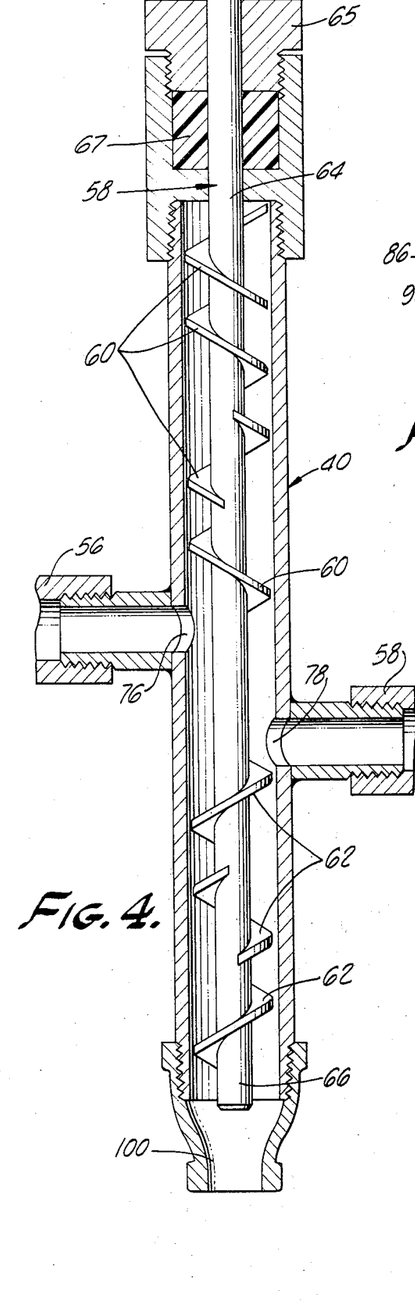
FIG. 4 is a sectional front elevation view taken along line 4—4 of FIG. 1, showing the mixing chamber.

Referring to FIG. 4, it will be noted that the tubing or line 56 from the resin supply chamber 14 communicates with the mixing chamber 40 through an orifice 76 spaced above the orifice 78 through which the conduit 58 from the hardener chamber 16 communicates with the mixing chamber. This arrangement of the resin entrance orifice 76 above the hardener entrance orifice 78 and the direction of the vanes 60 facilitates cleaning the mixing chamber 40 by insuring that none of the hardener 20 will enter the upper portion of the mixing chamber. The pneumatic motor 68 is designed to rotate the mixer shaft 58 in the direction of the arrow shown in FIG. 4, (clockwise, viewed from above), so that the vanes 60 on the upper portion of the shaft will direct the resin 18 downwardly, and the vanes 62 on the lower portion of the shaft will direct the resin and hardener substances upwardly. Thus, the resin and hardener are mixed in a central portion of the mixing chamber 40. When it is desired to clean or purge the mixing chamber 40, communication between the hardener supply chamber 16 and the mixing chamber 40 is blocked via valve 52 or valve 54, and the pump 42 is operated to dispense resin 18 through the resin entrance orifice 76 and the central and lower portions of the mixing chamber 40.

Figure 5:
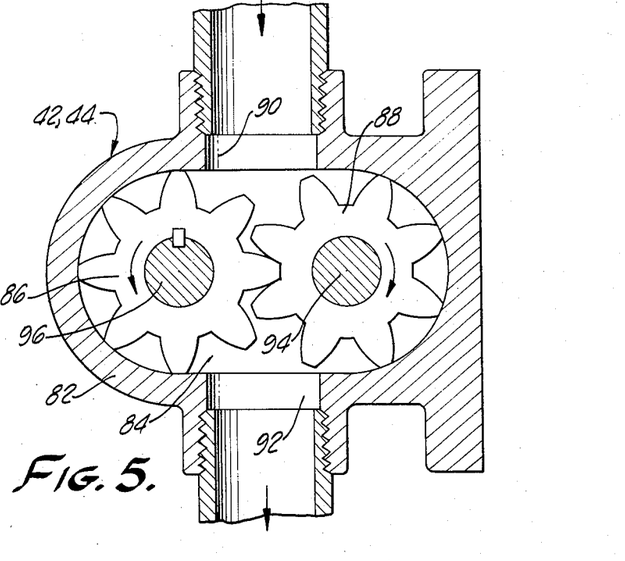
FIG. 5 is a sectional side elevation view taken along the line 5—5 of FIG. 2, showing the details of one of the pumps.

The detailed structure of each of the rotary gear pumps 42, 44 is shown in FIG. 5. Each pump comprises a housing 82 having a gear chamber 84 in which a drive gear 86 and a driven gear 88 are rotatably mounted. The gears 86 and 88 may be made of any suitable material, such as brass or steel. An inlet orifice 90 in the upper portion of the pump housing 82 communicates with its resin or hardener chamber 14 and 16 through valve 48 or 52, and an outlet orifice 92 in the lower portion of the housing communicates with the mixing chamber 40. The driven gear 88 is mounted on a shaft 94 which is mounted and wholly contained in the pump housing, while the drive gear 86 is keyed to a drive shaft 96 which extends through both pumps 42, 44 and is rotated by the pneumatic drive mechanism 46, described in detail below.

When the drive shaft 96 is rotated in a counterclockwise direction, as viewed in FIG. 5, the drive gear 86 will rotate in a counterclockwise direction and will drive the driven gear 88 in a clockwise direction to draw the resin or hardener substance through the inlet orifice 90 and force it through the outlet orifice 92 and into the mixing chamber 40. The quantity of substance forced through the pump 42 or 44 will be determined by the arc through which the drive shaft 96 is rotated. Since the outlet orifice 92 of each pump communicates with the mixing chamber 40, the quantities of the substances forced through the pumps and into the mixing chamber will cause a corresponding quantity of the adhesive mixture in the lower portion of the mixing chamber to be pumped through the outlet nozzle 100 at the lower end of the chamber. In other words, the quantity of the mixture 46 dispensed through the outlet nozzle 100 will be equal to the sum of the quantities driven through pumps 42 and 44.

The pneumatic drive mechanism 46 for rotating the drive shaft 96 and operating the pumps 42, 44 is schematically illustrated in FIG. 3. An improved ratchet wheel 104 is fixedly mounted on the drive shaft 96 and is selectively and intermittently rotated through a predetermined arc by a pawl finger 106. The pawl finger 106, in turn, is moved through a predetermined lineal distance by the piston rod 108 of a piston 110 in a pneumatic cylinder 112. The opposite ends of the cylinder 112 are connected to a solenoid-operated valve 114, which, in turn, is connected to the compressed air supply 72. A switch 116 for controlling the solenoid valve 114 may be conveniently located adjacent the outlet nozzle 100 of the mixing chamber 40 so that the switch may be actuated by placing a road marker or button 118 (FIG. 3) under the nozzle and against the switch. As best shown in FIG. 1, the switch 116 may be actuated by a lever 120 located between the switch and the outlet nozzle 100.

Figure 2:
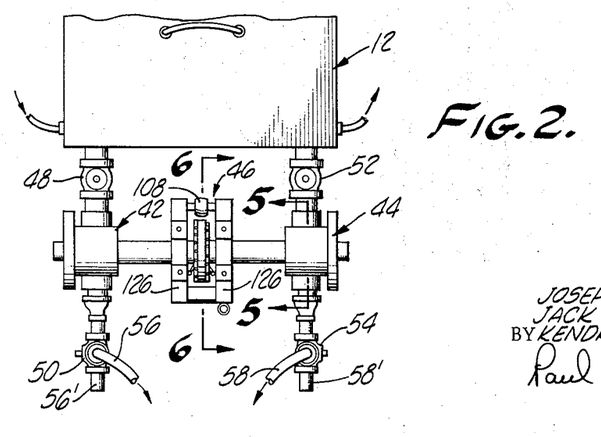
FIG. 2 is a front elevation view taken along the line 2—2 of FIG. 1, showing the interconnection between the storage tanks for the substances to be mixed, the pumps for pumping such substances to a mixing chamber, and the drive system for operating the pumps.
Figure 7:
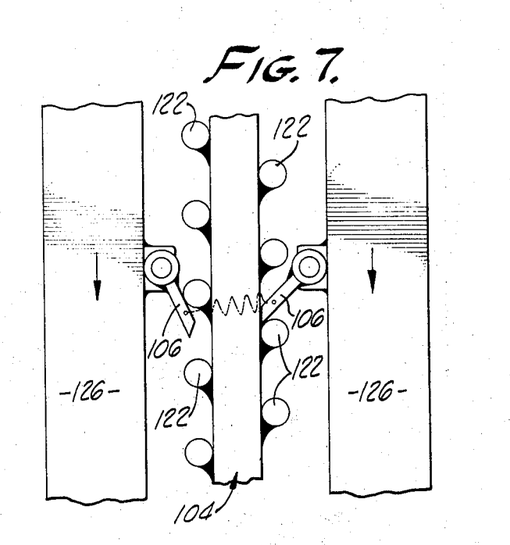
FIG. 7 is a front elevation view of the improved ratchet-and-pawl mechanism employed in the drive mechanism for the pumps in the FIG. 1 embodiment.

The detailed construction of the ratchet-and-pawl mechanism for driving the shaft 96 is best shown in FIGS. 2, 6 and 7. The ratchet wheel 104 keyed to the shaft 96 is a novel and improved type of ratchet wheel particularly designed to withstand the relatively heavy loads necessary to operate the pumps 42 and 44. As best shown in FIG. 6, the ratchet wheel 104 is a generally disc-shaped member having its teeth 122 in the form of radially-extending, circumferentially-spaced slugs disposed on both side faces of the disc.

A pair of pawl fingers 106, 106 (FIG. 7) are mounted on bracket arms 126, 126 on either side of the ratchet wheel 104 and are spring-biased into engagement with the teeth or slugs 122. Each bracket arm 126 is rotatably mounted on the drive shaft 96 by a journal 128 (FIG. 6) and the upper end of each arm is connected to the forward end of the piston rod 108. As shown in FIG. 7, the pawl fingers 106, 106 are pivotably mounted on their respective bracket arms 126, 126 and spring-biased toward one another, whereby one of the pawl fingers will drive the ratchet wheel when the bracket arms are rotated in one direction (clockwise, as shown in FIG. 6), but will slip past the ratchet wheel teeth and will not rotate the ratchet wheel when the bracket arms are rotated in the other direction (counterclockwise, as viewed in FIG. 6). The lower end of one of the bracket arms 126 may be provided with a socket 130 adapted to receive a lever 132 for manually rotating the ratchet wheel 104 and shaft 96 to drive the pumps 42 and 44.

An improved heating system for the resin 18 and hardener 20 in the supply chambers 14 and 16, respectively, is shown in FIGS. 1 and 3. Thermal-conductive tubing 26 extends from a water supply tank 22, through a suitable heater (e.g., butane torch) 24, through the resin and hardener supply chambers 14, 16 and back to the water tank 22. It will be noted that the tubing 26 is coiled at 140 and 142, adjacent the outlets 144 and 146 of the resin and hardener chambers 14 and 16, respectively. This is to insure that the resin and hardener substances are heated to maintain them in semi-liquid states as they are pumped from their respective chambers to the mixing chambers 40.

The water 148 in the supply tank 22 is pumped through the heater 24 and the resin and hardener storage chambers 14, 16 by a suitable pump 150. The pump 150 may, for example, be a variable pitch pump, and a bypass line 152 having a bypass valve 154 therein may be employed to regulate the amount of water flowing through the tubing 26, thereby minimizing the load on the pump 150.

As shown in FIG. 1, a seat 160 is mounted on a support platform 162, which, in turn, is slidably mounted on a beam 163 which extends transversely beneath the rear portion of the truck bed 164 on which the apparatus 10 is mounted. The seat 160 is preferably located adjacent the outlet nozzle 100 of the mixing chamber 40, and relatively close to the ground for seating a workman who may operate the switch 116 to intermittently dispense predetermined quantities of the adhesive mixture from the mixing chamber onto the bottom of the road markers 118 to be applied. As the truck moves forwardly, the workman seated on the seat 160 may place each road marker 118 bottom-side-up on the ground, and a following workman may then properly position and secure each road marker in place. It is usually desirable to have the seat 160 located adjacent the driver's side of the truck so that the driver may view the seated workman in his side view mirror. However, the seat platform 162 is slidably mounted on the beam 163 so that it may be positioned at any desired location along the rear edge of the truck bed.

OPERATION OF EMBODIMENT OF FIGS. 1-7

When it is desired to operate the apparatus 10, the water pump 150 (FIG. 3) and the heater 24 are turned on to pump the hot water through the resin and hardener chambers 14 and 16. The bypass valve 154 is left closed until water flow through the tubing 26 has started. Thereafter, the bypass valve 154 is opened a predetermined amount to minimize the strain on the pump 150 while insuring that sufficient water is flowing through the system.

It should be noted that it may not be necessary to employ the heating system if the temperature in the environment in which the apparatus 10 is to be operated is relatively high (e.g., over about 80°-90°F.).

With the heating system operating, the flexible lines 56, 58 from the three-way valves 50 and 54, respectively, are connected to the mixing chamber 40, and valves 50 and 54 are turned to establish communication between the mixing chamber and pumps 42 and 44. Thereafter, the pneumatic motor 68 for the mixing shaft 58 is turned on, and the switch 116 is actuated several times to operate the pumps 42 and 44, and thereby deliver resin 18 and hardener 20 to the mixing chamber 40 and dispense the adhesive mixture 46 from the nozzle 100.

The switch 116 should be repeatedly actuated until it is observed that the mixture being dispensed from the nozzle 100 is relatively homogeneous and includes the proper ratio of resin-to-hardener. It is preferable to have the resin and the hardener in contrasting colors (e.g., white and black), so that the color of the mixture dispensed from the nozzle 100 is indicative of the resin-to-hardener ratio. For example, if the resin is white and the hardener is black, the operator can tell that the mixture contains the proper resin-to-hardener ratio when it is a particular shade of grey.

The solenoid valve 114, the pneumatic cylinder 112, and the ratchet and pawl mechanism 104, 106 operate in the following manner to rotate the pump drive shaft 96.

When the switch 116 is in the off position (solid line position of FIG. 3), the solenoid core 170 is in the rear position (solid line position of FIG. 3). In this position, communication is established between inlet port 171 and port 172 of the solenoid valve chamber 168, which is connected to the forward end of the pneumatic cylinder 112, thereby establishing communication between the compressed air supply 72 and the forward portion of cylinder 112, to maintain the piston 110 in its rearwardmost position (FIG. 3 position). An adjustable gauge stop, comprising a threaded bolt 173 extending through the rear end of the cylinder 112, limits rearward movement of the piston 110 to regulate the length of the piston stroke.

When the switch 116 is actuated (dotted line position of FIG. 3), the circuit of the solenoid coil 175 is closed and the core 170 will be driven to its forwardmost position (dotted line position of FIG. 3) to establish communication between inlet port 171 and port 176 which is connected to the rear portion of the pneumatic cylinder 112. This establishes communication between the compressed air supply 72 and the rear portion of the pneumatic cylinder to drive the piston 110 forwardly.

As the piston 110 moves forwardly, its shaft 108 connected to bracket arms 126 (see FIG. 6) also moves forwardly to rotate the ratchet wheel 104 through a predetermined arc, determined by the length of the stroke of the piston 110. As the ratchet wheel 104 is rotated, it will rotate the pumps' drive shaft 96 on which the ratchet wheel is mounted. Rotation of the drive shaft 96 will, in turn, rotate the drive gear 86 in each pump 42, 44, which, in turn, rotates the driven gear 88. As the gears 86 and 88 in the pumps 42, 44 rotate, they will draw resin 18 and hardener 20 through the pumps and force them into the mixing chamber 40. As additional resin and hardener are forced into the mixing chamber 40, an equal amount of the mixture in the lower portion of the chamber will be forced or shot outwardly through the nozzle 100 and onto the traffic marker 118 held under the nozzle.

It will be noted that the teeth or slugs 122 on the opposite sides of the ratchet wheel 104 are circumferentially offset from one another. This arrangement provides twice the effective number of teeth which may be engaged by one of the pawls 106.

When the spring return switch 116 returns to its off position (solid line position of FIG. 3), the core 170 will return to its rearwardmost position (solid line position of FIG. 3) to reestablish communication between the rear port 176 of cylinder 112 and the exhaust port 177 of chamber 168, thereby permitting the air in the rear of cylinder 112 to exhaust through port 177.

It will be noted that the exhaust port 177 includes a regulator valve 178, while the exhaust port 179 at the forward end of the solenoid valve chamber 168 does not. The purpose of the regulator valve 178 is to cushion the return of the piston 110 to prevent damage which might occur if the piston repeatedly slammed against the stop member 173. No valve is required or desired in the exhaust port 179, because it is desirable to have the piston 110 driven forwardly with relatively great enough force to pump the resin and hardener out of the mixing chamber 40.

After use, it is desirable to clean or purge the mixing chamber 40 of all the adhesive mixture therein to prevent the mixture from hardening and clogging the lower portion of the chamber and the outlet nozzle 100. This purging or cleaning operation may be accomplished quickly and efficiently by simply disconnecting the hose or line 58 from the mixing chamber 40 and actuating the switch 116 several times to operate the pumps 42, 44, whereupon several "shots" of resin 18 will be driven through the mixing chamber 40, dispensing nozzle 100, and the port 78 to which the line or hose 58 from the hardener chamber 16 was connected. After several "shots" of resin have been driven through the mixing chamber 40, only resin will remain therein. If the resin and hardener are different colors, as is desired, the color of the substance dispensed from the nozzle 100 will indicate whether all of the hardeners have been purged from the mixing chamber. During this purging operation, the three-way valve 54 may conveniently be positioned to direct the hardener 20 driven through the line 58 by the pump 44 through the outlet line or hose 58' and into a suitable receptacle (not shown) placed thereunder.

DESCRIPTION OF EMBODIMENT SHOWN IN FIGS. 8–11

The mixing and dispensing apparatus 200 shown in FIGS. 8–11 is more compact and mobile than the larger dispensing apparatus 10 illustrated in FIGS. 1–7 and described above. As such, the dispenser 200 is more practical for entities having intermittent need for such a unit, such as cities and municipalities, while the larger unit 10 (FIGS. 1–7) is more likely to be purchased by companies in the business of applying pavement markers to roads, their need for such a unit being continuous.

Figure 8:
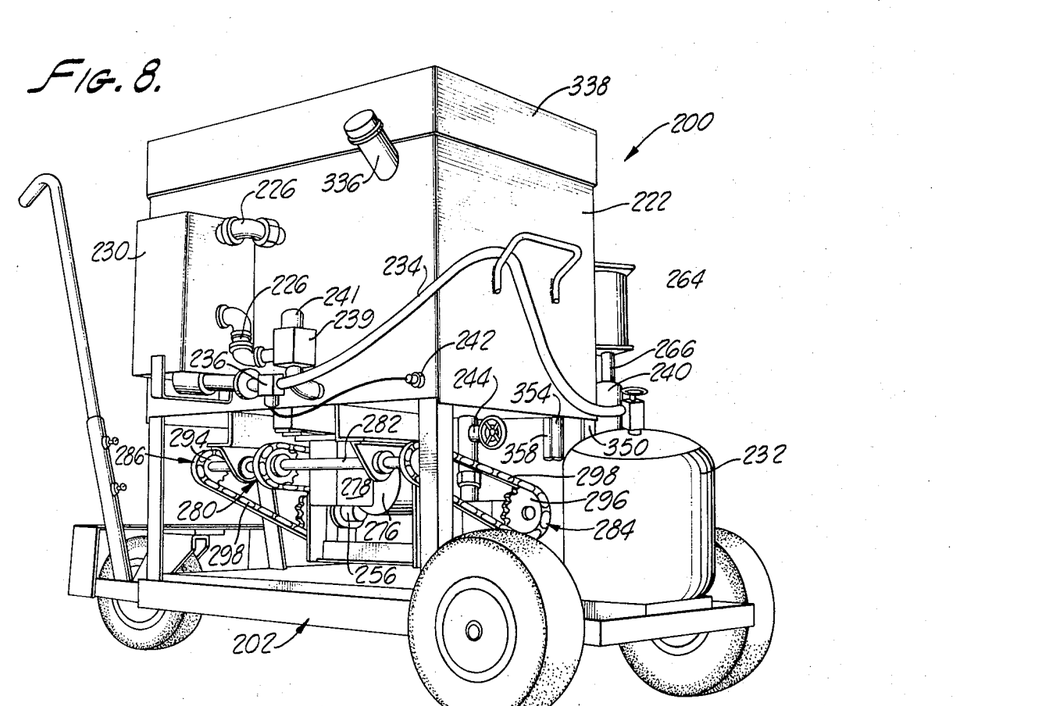
FIG. 8 is a perspective view of a second preferred embodiment of the present invention.

Like the dispensing unit 10 shown in FIGS. 1–7, the unit 200 of FIGS. 8–11 is designed to mix proportionate quantities of resin and hardener into a homogeneous mixture, and to dispense that mixture onto a pavement marker or the like. In FIG. 8, the unit 200 is mounted on a manually-movable four-wheeled platform 202. It is contemplated, however, that it will usually be desirable to carry the unit on a motor-driven vehicle, such as a pick-up truck, for example.

Referring to FIGS. 8–11, the mixing and dispensing unit 200 is seen to comprise a tank 212 divided into separate chambers 214 and 216 for containing supplies of two substances to be mixed, such as epoxy resin 218 and a suitable hardener 220, for example.

The resin and hardener chambers 214, 216 are continuously heated by a system which differs in several respects from the heating system of the unit 10 shown in FIGS. 1–7. The resin-hardener tank 212 is immersed in a water tank 222 filled with water 224. The water 224 is heated by pumping it through a line of heat conductive tubing 226 which includes a coiled portion 228 in a heating chamber 230. A butane torch 231, connected to a butane bottle 232 through a hose 234 and valve 236, heats the coiled portion of the tubing 228.

A water pump 239, driven by an electric motor 241 (FIG. 9), is provided for circulating the water 224 through the heating chamber 230. Preferably, the water 224 is drawn from the bottom portion of the water tank 222 and returned to the upper portion of the tank.

A thermostat 242 may be provided in the water tank 222 for controlling operation of the butane torch 231 to insure that the temperature of the water 224 in the tank is maintained within a desired temperature range (e.g., between about 100°F. and 120°F.

Although not shown in FIGS. 8–11, the upper ends of the resin and hardener chambers 214 and 216 may be provided with scraper blades of the type shown in FIGS. 1 and 3 above to facilitate filling these chambers with the relatively viscous resin and hardener substances 218 and 220.

Figure 9:
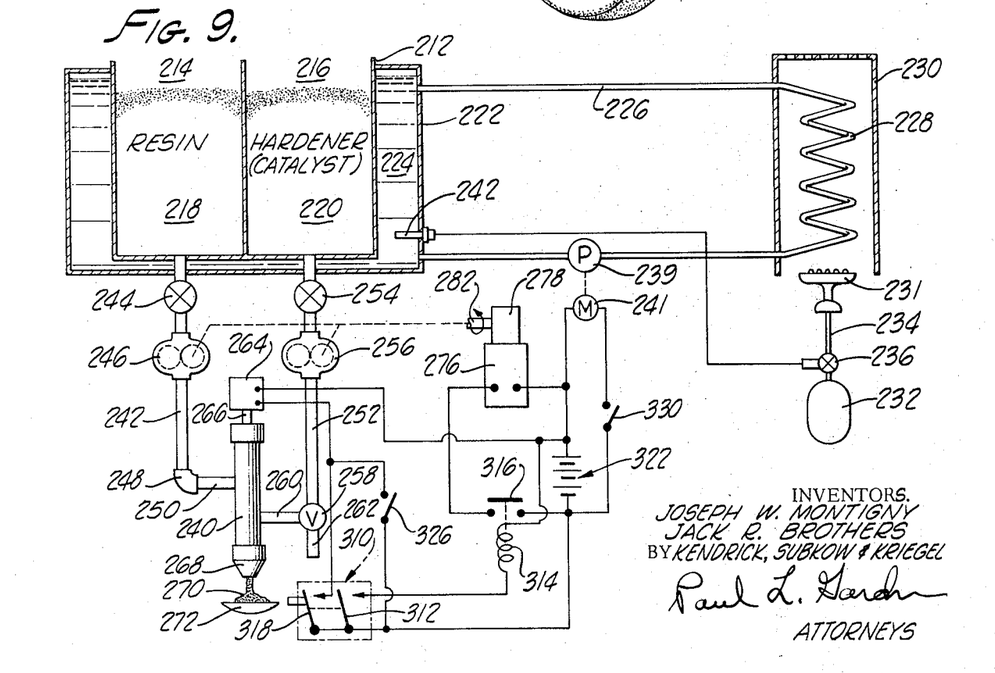
FIG. 9 is a schematic diagram of the mixing and dispensing unit shown in FIG. 8.

As best shown in FIG. 9, the bottom of the resin chamber 214 communicates with the upper portion of a mixing chamber 240 via a pipe line 242, having a manually-operable valve 244 and a rotary gear pump 246 therein, an elbow 248, and a pipe 250. The bottom of the hardener chamber 216 communicates with the lower portion of the mixing chamber 240 via pipe lines 252 and 260. Pipe line 252 has a manually-operable valve 254, a rotary gear pump 256 and a three-way valve 258 therein.

The manually-operable valves 244 and 254 may be selectively opened or closed to establish or block communication between each chamber 214, 216 and its associated pump 246 or 256.

The three-way valve 258 is operable to selectively establish communication between the hardener pump 256 and the mixing chamber 240, or between the pump 256 and a hardener discharge pipe 262.

The mixing chamber 240 is substantially identical to the mixing chamber 40 of the dispensing apparatus 10 described above. As best shown in FIG. 4, the mixing chamber comprises a rotatable shaft 58 having oppositely-angled vanes 60, 62 or continuous helical blades (not shown) arranged to direct the resin and hardener into the central portion of the chamber.

Referring to FIG. 9, the upper end 264 of the mixing shaft is connected to an electric motor 266 which is operable to rotate the mixing shaft and mix the resin and hardener in mixing chamber 240. An outlet nozzle 268 is provided on the lower end of the mixing chamber 240 for facilitating application of the resin-hardener mixture 270 on the object (e.g., pavement marker 272) to which the mixture is to be applied.

The rotary gear pumps 246 and 256 are substantially identical to the pumps 42 and 44 of the dispensing unit 10 shown in FIGS. 1–7 and described above, the details of each pump being best shown in FIG. 5.

Figure 11:
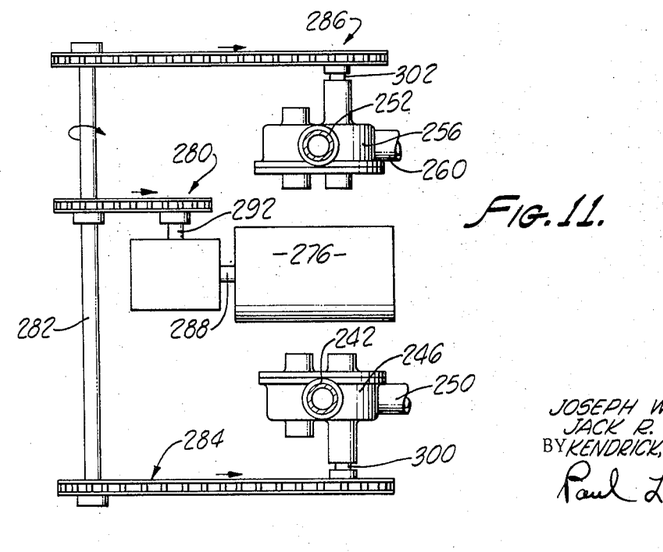
FIG. 11 is a top plan view of the pump driving mechanism of the unit shown in FIGS. 8–10.

The drive system for the pumps 246 and 256 is significantly different than the drive system for the pumps 42 and 44 in the FIGS. 1–7 embodiment. As best shown in FIG. 11, the pumps 246 and 256 are driven by an electric motor 276 (e.g., a 12 Volt D.C. motor), via a gear box 278, a chain and sprocket drive assembly 280, a drive shaft 282, and chain and sprocket drive assemblies 284 and 286.

The gear box 278 (e.g., having a 40 to 1 reduction ratio), is driven by the motor 276, via a shaft 288, and, in turn, drives one of the sprockets of the chain-andsprocket assembly 280 via a shaft 292. The other sprocket of assembly 280 is keyed to the drive shaft 282, as is one of the sprockets 294 (FIG. 10) of each of the assemblies 284 and 286. As drive shaft 282 is rotated, each sprocket 294 of assemblies 284 and 286 is rotated, and, in turn, rotates each associated sprocket 296 via chain 298.

The drive gear 86 (FIG. 5) of each of pumps 246 and 256 is keyed to an associated shaft 300 or 302 (FIG. 11) which is rotated by its associated sprocket 296. The drive gears 86 rotate driven gears 88 (FIG. 5) in the pumps 246 and 256 to pump resin 218 and hardener 220 from the chambers 214 and 216, respectively, to the mixing chamber 240.

As shown in FIG. 9, operation of the motor 276 is controlled by a microswitch 310 which is preferably mounted beneath the outlet nozzle 268 of the mixing head 240. The microswitch 310 is preferably a double-pole, single throw type switch, one pole 312 being adapted, when closed, to energize the coil 314 of a solenoid switch 316, and the other pole 318 being adapted, when closed, to energize the electric motor 264 for turning the mixer shaft 266 of the mixing chamber 240. When the actuating lever 320 (FIG. 10) of microswitch 310 is depressed, the pole 312 is closed to establish a complete circuit through a battery 322 and the coil 314 of solenoid switch 316 to close the switch 316 and establish a complete circuit between the battery 322 and the pump motor 276. Simultaneously, the pole 318 completes the circuit between the battery 322 and the mixer motor 264 to start the mixer.

As best shown in FIG. 9, a manual override switch 326 is provided between the mixer motor 264 and the battery 322 so that the mixer may be turned on without turning on the pumps 246 and 256. The battery 322 is also connected to the motor 241 for operating the water pump 239 in the water heating system. A manually-operable switch 330 is provided for selectively connecting the motor 241 to the battery 322.

Referring to FIGS. 8 and 9, the water tank 222 is preferably provided with a water inlet pipe 336 and a cover 338. The bottom portion of the unit 200 is preferably covered by panels 340 (FIG. 10), such panels being removable to provide access to the drive system for pumps 246 and 256.

Figure 10:
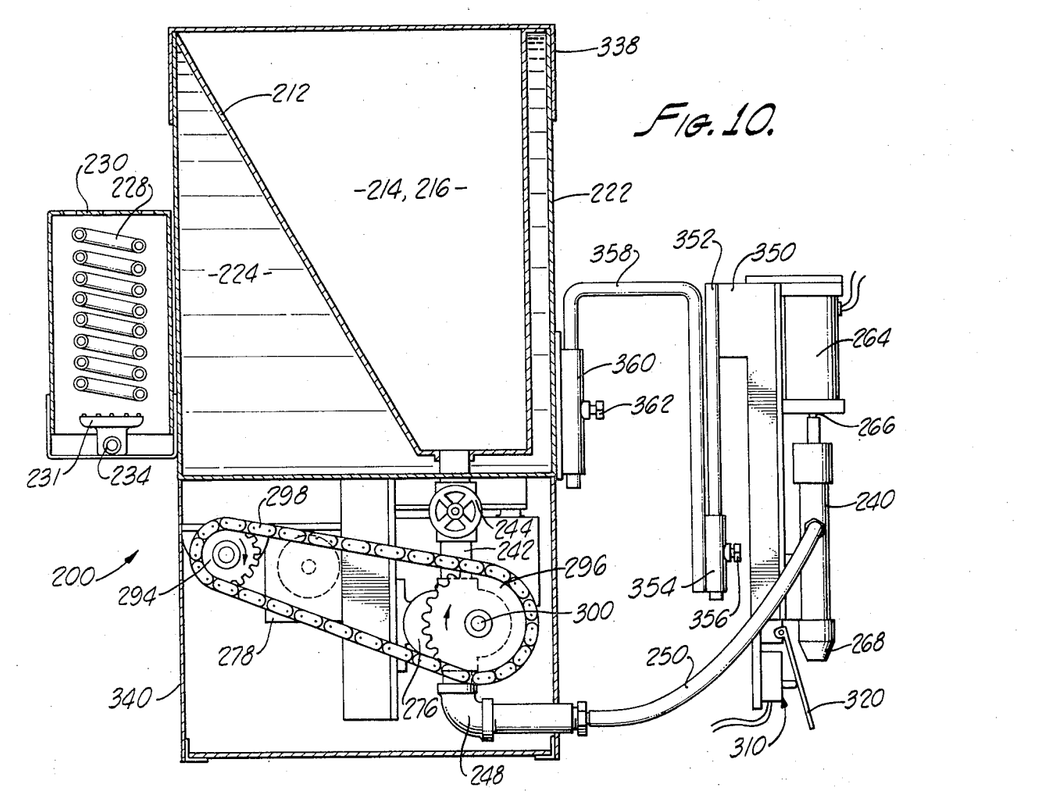
FIG. 10 is a side elevation view, partly in section, of the apparatus shown in FIG. 8.

As shown in FIG. 10, the mixing chamber 240, mixer motor 264 and microswitch 310 are mounted on a vertically adjustable fixture 350 having a mounting bar 352 slidably received in a tubular bracket 354. The vertical position of fixture 350 may be adjusted by loosening a set screw 356 which holds the bar 352 in place in bracket 354. The bracket 354, in turn, is mounted on a U-shaped mounting bar 358 which is slidably received in a tubular bracket 360 that is secured on the tank 222. The height of the mounting bar 358 may be adjusted by loosening a set screw 362 on the bracket 360.

OPERATION OF THE DISPENSER SHOWN IN FIGS. 8–11

In operation of the mixing and dispensing unit 200, the compartments 214 and 216 of the container are filled with resin 218 and epoxy 220, respectively.

If the temperature of the environment in which the unit 200 is to be employed is not sufficiently warm (i.e., if the air temperature is below about 70°–80°F.), the water tank 222 is filled with water 224 through the water inlet pipe 336 (FIG. 8), and the butane bottle 232 is connected to the butane burner 231. The burner 231 is then lit and the water pump motor switch 330 (FIG. 9) is closed to energize the wate pump motor 241 and operate the water pump 239. The water pump 240 will continuously pump the water 224 through the heating compartment 230 to maintain the water in tank 222 at the desired temperature. The thermostat 242, if employed, continuously monitors the control valve 336 in the butane line 234 to insure that the temperature of the water in the tank 222 is maintained within the desired temperature range (i.e., between about 100°F. and about 120°F.).

When the resin 218 and hardener 220 in the compartments 214 and 216, respectively, have been heated to the desired temperature and are in semi-liquid states, the three-way valve 258 is turned to connect the line 252 from the hardener pump 256 to the discharge pipe 262, and the manual override switch 326 is closed to start the mixer shaft motor 264. The lever 320 (FIG. 10) for the pump motor switch 310 is then depressed several times to close the switch, operate the pumps 246 and 256, and dispense resin through the mixer nozzle 268 and hardener through the discharge pipe 262.

Since the resin 218 and hardener 220 are generally of contrasting colors (e.g., white and black), a quick visual check will assure the operator that only resin is being pumped through the mixing chamber 240.

When the operator observes that resin 218 is being discharged through the nozzle 268 of the mixing chamber 240, he knows that the mixing chamber has been filled with resin from the chamber 214. He then turns the three-way switch 258 to connect the hardener line 252 from the hardener pump 256 to the lower inlet line 260 to the mixing chamber 240. The pump motor switch 310 is then closed to operate both pumps 246 and 256 and deliver resin 218 and hardener 220 to the mixing chamber. Since the mixer motor 264 will be turned on each time the switch 310 is closed, the manual override switch 326 may be opened. However, if the resin 218 and hardener 220 being mixed are relatively liquid, the switch 326 may be left closed to keep the mixer motor 264 running continuously. The vanes 62 (FIG. 4) on the lower portion of the mixer shaft 58 will continuously direct the mix in the chamber 240 upwardly to prevent the mix from dripping from the outlet nozzle 268.

The shade and consistency of the color of the mixture 270 dispensed from the nozzle 268 of mixing chamber 240 indicates whether the mixture contains the proper ratio of resin-to-hardener.

For example, if the resin is white and the hardener is black, as preferred, the operator will know that the mixture 270 is proper when it is a particular shade of grey.

When the mixture 270 is proper, the dispenser unit 200 is ready for use. The operator may then place an item (e.g., such as pavement marker or "button" 272, FIG. 9) beneath the outlet nozzle 268 of the mixing chamber 240 and close the microswitch 310 by depressing the lever 320 located just behind the nozzle 268 (FIG. 10) to apply the adhesive mixture to the item.

After use, the mixing chamber 240 should be cleaned to prevent the adhesive mixture 270 from hardening and clogging the chamber 240. This cleaning operation is accomplished by simply turning the three-way valve 258 to divert hardener from the line 252 to the discharge line 262, rather than the inlet pipe 260 to the mixing chamber 240. The microswitch 310 is then depressed to pump resin 214 through the mixing chamber 240. When the operator observes that only resin 218 (e.g., white material) is being pumped through the outlet nozzle 268 he knows that the mixing chamber 240 is clean of any hardener.

We claim:

1. Apparatus for mixing a plurality of substances into a substantially homogeneous mixture and selectively dispensing a discrete quantum of said mixture, comprising:

a plurality of storage chambers for storing substances to be mixed;

a mixing chamber communicating with each of said storage chambers, said mixing chamber having a housing with a first inlet communicating with one of said storage chambers and a second inlet communicating with a second storage chamber, a mixing device mounted in said mixing chamber with said mixing device having a rotatable shaft extending at least partially through said mixing chamber and the shaft having an upper end and a lower end, and a plurality of mixer vanes mounted on the upper and lower ends of said shaft with the vanes on said upper and lower ends of said shaft being disposed to urge substances in said mixing chamber inwardly from either end of the chamber toward the central portion of said chamber;

power-operable pump means operatively associated with each of said storage chambers for selectively pumping substances from said storage chambers to said mixing chamber;

power supply means operatively associated with said pump means and said rotatable shaft;

mixer actuator means for selectively connecting said shaft to said power supply means to mix substances in said mixing chamber; and pump actuator means for selectively connecting said pump means to said power supply means to actuate said pump means and pump substances from said storage chambers to said mixing chamber.

2. An improved mixing and dispensing apparatus according to claim 1, wherein one of said inlets to said mixing chamber is disposed higher than said other inlet, whereby the mixing chamber may be purged by disconnecting said lower inlet from its storage chamber, and operating said pump means to force substance from said one storage chamber through said mixing chamber.

3. An improved mixing and dispensing apparatus according to claim 1, wherein said pump means comprises a rotary gear-type pump disposed between said mixing chamber and each of said storage chambers; said rotary gear pump including a housing having an inlet opening communicating with its associated storage chamber and an outlet opening communicating with said mixing chamber, and a pair of intermeshing gear wheels rotatably mounted in said housing for pumping a substance from said inlet opening through said outlet opening.

4. A mixing and dispensing apparatus according to claim 1 and including a water tank enclosing a substantial portion of said storage chambers; a heating zone; and means for pumping water from said water tank through said heating zone, and returning it to said tank.

5. A mixing and dispensing apparatus according to claim 1 including a tubular member extending through said storage chambers, a water storage container communicating with said tubular member, water pump means for pumping water from the water supply through said tubular member, and heater means for heating the water pumped through said tubular member.

6. A mixing and dispensing apparatus according to claim 1 wherein the vanes at one end of said shaft have a right-hand helical configuration while the vanes at the other end of said shaft have a left-hand helical configuration.

7. An improved mixing and dispensing apparatus for mixing metered quantities of a plurality of substances and selectively dispensing a predetermined quantity of the mixture, said improved apparatus comprising:

a plurality of separate storage chambers for storing substances to be mixed;

a mixing chamber communicating with said storage chambers;

pump means positioned between the storage chambers and the mixing chamber;

a mixing device mounted in said mixing chamber for mixing the substances received from said storage chambers;

said mixing chamber including a first inlet connected to one of said substance storage chambers and a second inlet connected to a second of said substance storage chambers;

said first inlet being located above said second inlet and adjacent the upper portion of said mixing chamber, and power means drivingly connected to said pump means to pump substances from the storage chambers into the mixing chamber, and including an intermittent drive to impart an intermittent predetermined stroke to said pump means, whereby a predetermined quantity of the substances is introduced into the mixing chamber on each actuation of the power means and the said mixing chamber may be purged by disconnecting said second inlet from the second storage chamber and operating said pump means for introducing the substance in said one storage chamber into the mixing chamber and dispensing the contents in the mixing chamber.

8. An improved mixing and dispensing apparatus for mixing metered quantities of a plurality of substances and selectively dispensing a predetermined quantity of the mixture; said improved apparatus comprising:

a plurality of separate storage chambers for storing substances to be mixed;

a mixing chamber communicating with said storage chambers, said mixing chamber including means for mixing metered quantities of the substances from said storage chambers; and pump means disposed between said mixing chamber and at least one of said storage chambers for selectively metering a predetermined quantity of the substance in said one storage chamber into said mixing chamber;

said pump means comprising a housing having an inlet opening communicating with said one storage chamber and an outlet opening communicating with said mixing chamber, and a pair of intermeshing gear wheels rotatably mounted in said housing for pumping a substance from the inlet opening through the outlet opening; and driving means for rotating one of said gear wheels through a predetermined arc, said driving means comprising a rotatable shaft operatively connected to said one gear wheel for rotating the same, a ratchet wheel mounted on said shaft for rotation therewith, pawl means operatively associated with said ratchet wheel for selectively and intermittently rotating said ratchet wheel through a predetermined arc to rotate said shaft and said one gear wheel, and a pneumatic piston and cylinder assembly for operating said pawl means to rotate said ratchet wheel.

9. An improved mixing and dispensing apparatus according to claim 8, wherein said ratchet wheel comprises a generally circular disc having oppositely facing sides and a plurality of circumferentially spaced abutments mounted on said sides; and wherein said pawl finger is adapted to engage one of said abutments to rotate said ratchet wheel when said bracket is rotated in one direction and is adapted to be deflected by said abutments when said bracket is rotated in the opposite direction.

10. An improved mixing and dispensing apparatus according to claim 9, and further comprising means on said cylinder for regulating the length of the piston stroke therein to limit the distance said pawl means moves said ratchet wheel.

11. An improved mixing and dispensing apparatus for mixing metered quantities of a plurality of substances and selectively dispensing a predetermined quantity of the mixture; said improved apparatus comprising:

a plurality of separate storage chambers for storing substances to be mixed; at least one of said storage chambers having a cover member; means defining an inlet opening in said cover member; and an improved scraping device for scraping the substance to be stored in said chamber from the container in which said substance is normally held; said improved scraping device comprising a generally inverted U-shaped scraper blade mounted over said inlet opening in said cover member; whereby a container of the substance to be stored in said chamber may be inverted and placed over said scraper blade, and rotated, whereby the scraper blade will scrape the substance in the container from the internal peripheral wall thereof and the substance will drop into the storage chamber;

each of said storage chambers having an outlet;

heating means extending through at least one of said storage chambers for heating the substance stored therein; said heating means comprising a tubular member extending through said storage chamber; said tubular member including a coiled portion disposed adjacent to the outlet of said storage chamber; a water supply connected to said tubular member; means for pumping water from said water supply through said tubular member; means for heating the water pumped through said tubular member; and a by-pass line having a by-pass valve therein for regulating the quantity of water flowing through said tubular member; whereby said heated water being pumped through said tubular member will heat the substance in the storage chamber through which said tubular member passes;

a mixing chamber communicating with said storage chambers and including means for mixing the substance into a substantially homogeneous mixture; said mixing chamber comprising a housing having a first inlet communicating with one of said substance storage chambers and a second inlet communicating with a second substance storage chamber, and a substance mixing device mounted in said mixing chamber; said substance mixing device comprising a rotatable shaft extending at least partially through said mixing chamber, said shaft having an upper end and a lower end, and a plurality of mixer vanes mounted on the upper and lower ends of said shaft; said vanes on said upper and lower ends of said shaft being disposed so as to urge substances in said mixing chamber toward the central portion of said chamber; one of said inlets to said mixing chamber being disposed higher than the other inlet;

pump means for metering a predetermined quantity of the substance in each storage chamber into said mixing chamber and dispensing a predetermined quantity of the mixture from said mixing chamber; said pump means comprising a rotary gear type pump disposed between said mixing chamber and each of said storage chambers; each of said rotary gear pumps including a housing having an inlet opening communicating with its associated storage chamber and an outlet opening communicating with said mixing chamber, and a pair of intermeshing gear wheels rotatably mounted in said housing for pumping a substance from the inlet opening through the outlet opening;

driving means operatively connected to at least one of said gear wheels in said pump for rotating said gear wheels through a predetermined arc to pump a predetermined quantity of substance therethrough; said driving means comprising a rotatable shaft operatively connected to one of said gear wheels in said pump for rotating the same, a ratchet wheel mounted on said shaft for rotation therewith, pawl means operatively associated with said ratchet wheel for selectively and intermittently rotating said ratchet wheel through a predetermined arc to rotate said shaft and said one gear wheel, and means for operating said pawl means to rotate said ratchet wheel; said pawl means comprising a bracket member rotatably mounted on said shaft for rotational movement relative thereto, and a pawl finger normally biased into engagement with said ratchet wheel for rotating said ratchet wheel when said bracket is rotated in one direction; said driving means further comprising a pneumatic piston and cylinder assembly operatively connected to said pawl means for selectively and intermittently moving said pawl means for selectively and intermittently moving said pawl means a predetermined distance to rotate said ratchet wheel, said shaft, and said pump gear wheels; means on said cylinder for regulating the length of the piston stroke therein to limit the distance said pawl means moves said ratchet wheel; and manually actuated switch means for operating said piston and cylinder assembly.

* * * * *